June 24, 1930.  L. DE FLOREZ  1,768,353
APPARATUS FOR FLOW CONTROL
Filed Jan. 3, 1929  8 Sheets-Sheet 8

Inventor
Luis de Florez
By his Attorney
R. J. Dearborn

Patented June 24, 1930

1,768,353

UNITED STATES PATENT OFFICE

LUIS DE FLOREZ, OF POMFRET, CONNECTICUT, ASSIGNOR TO THE TEXAS COMPANY, OF NEW YORK, N. Y., A CORPORATION OF DELAWARE

APPARATUS FOR FLOW CONTROL

Application filed January 3, 1929. Serial No. 330,023.

This invention relates to a system for the control of flow of a fluid, and has particular reference to the automatic control of fluid flow in response to changes in the value of a condition. The control may be used to cause variations in the rate of flow which are functions of the variations in the value of a condition, or it may be used to maintain the rate of flow of the controlled fluid at a substantially uniform rate.

The invention embodies the general principles of fluid flow control disclosed in my co-pending application Serial No. 82,865, filed January 21, 1926; although the invention is adapted to the control of flow generally, the following description and accompanying drawings are, for the sake of illustration, of a system applied to the automatic control of the flow of fuel to a furnace, or the like, the temperature of which it is desired to control.

Figure 1:
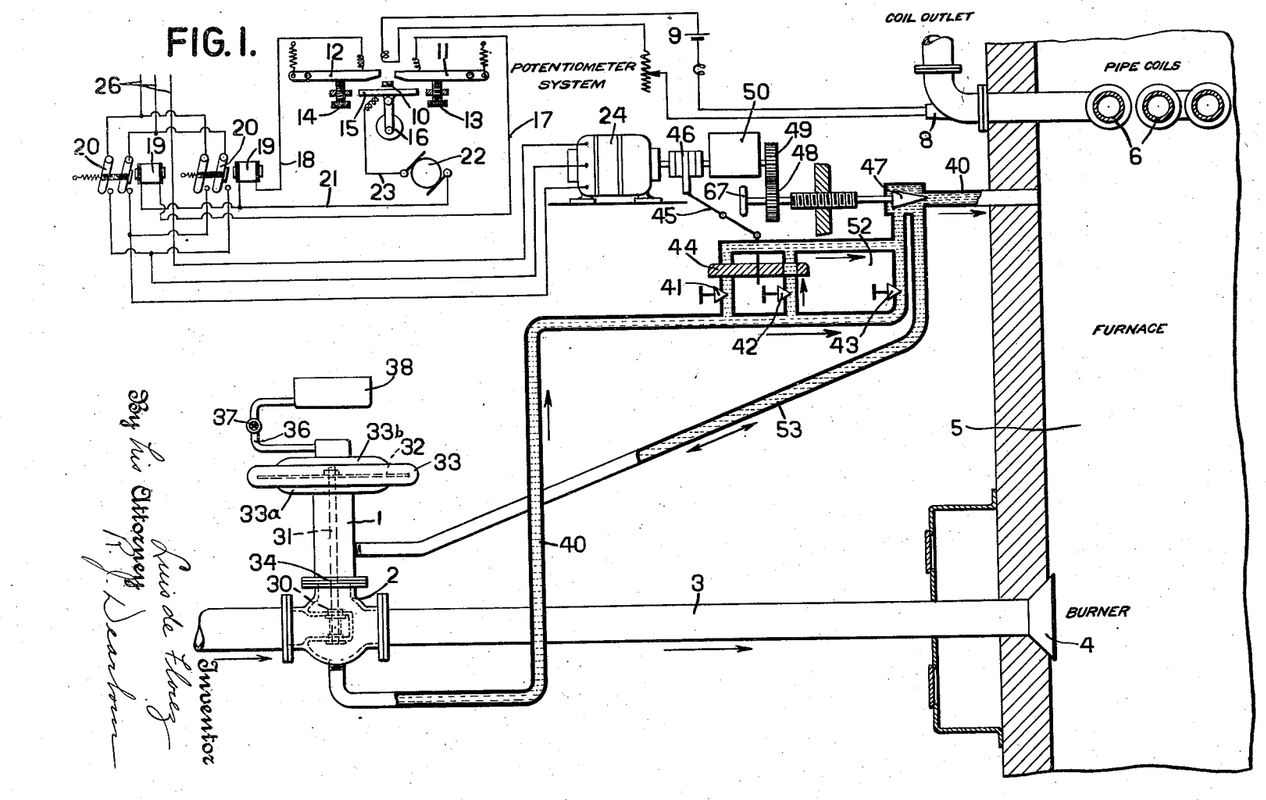
Figure 1 is a diagrammatic illustration partially in section of my control system applied to the regulation of the temperature of a furnace.
Figure 2:
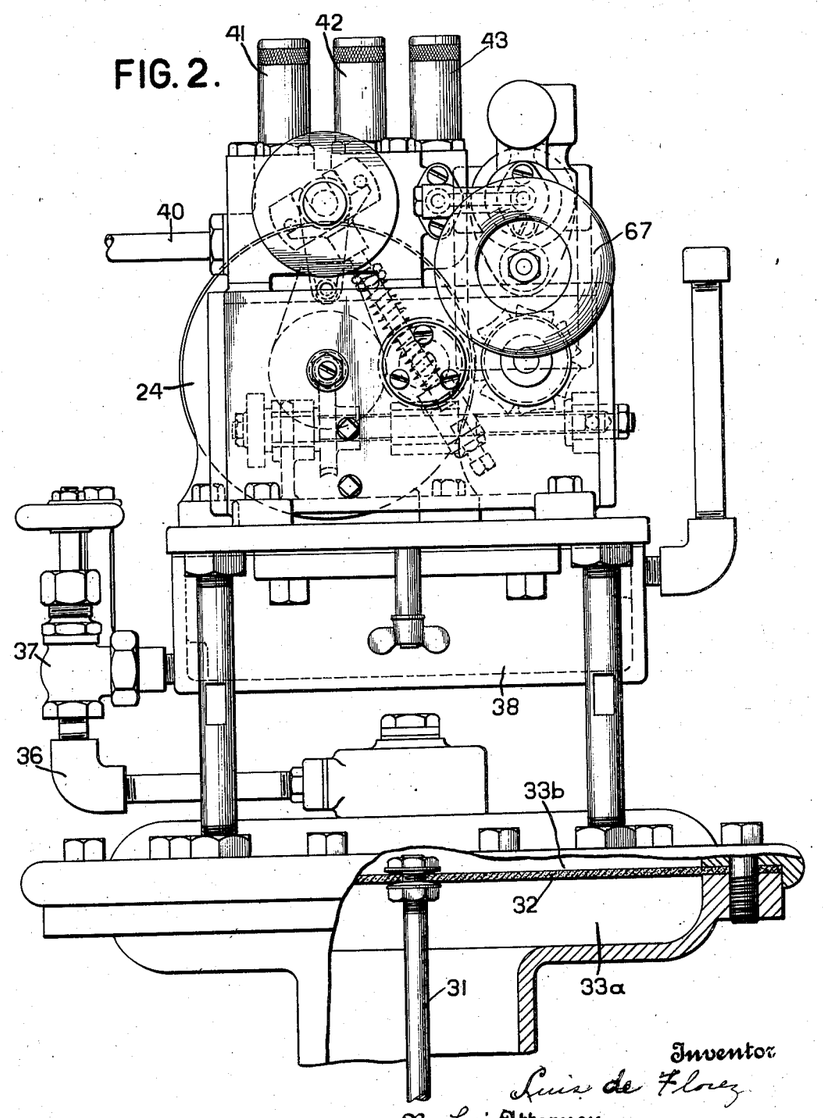
Figure 2 is a side elevation partially in section of one form of the control apparatus.
Figure 3:
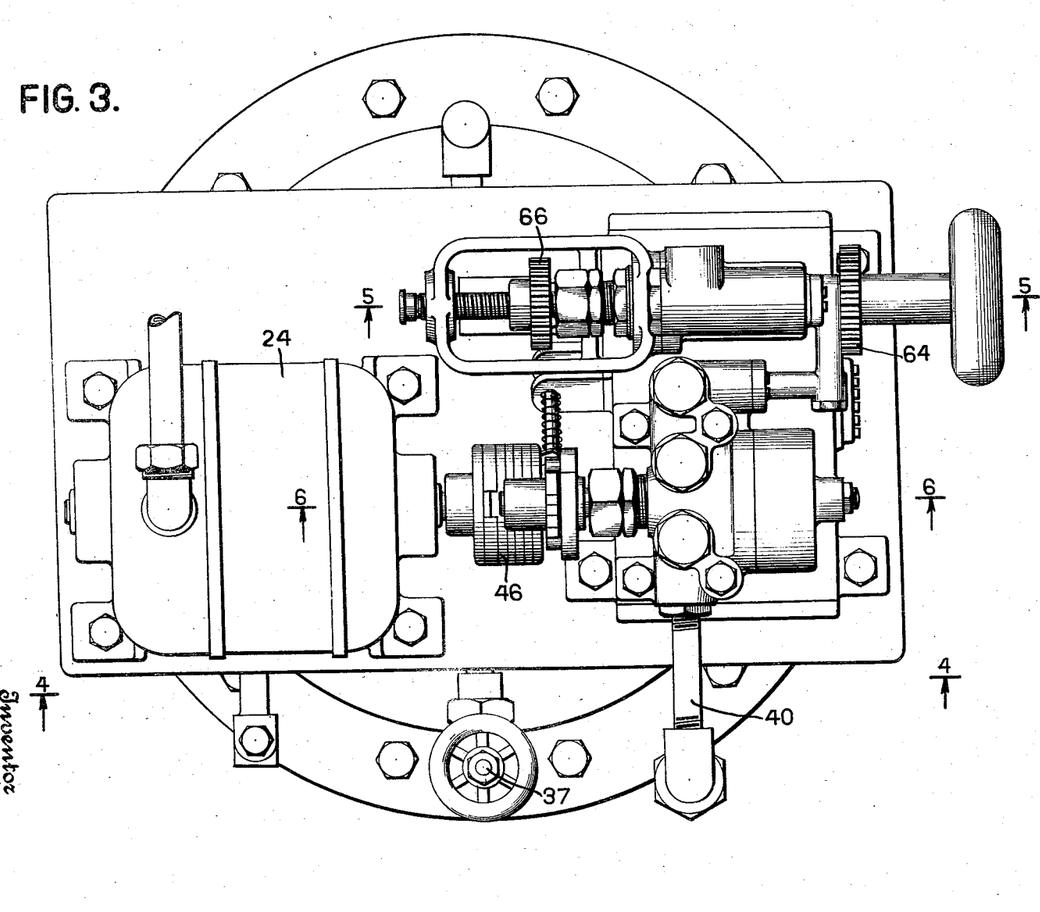
Figure 3 is a plan view of the same.
Figure 4:
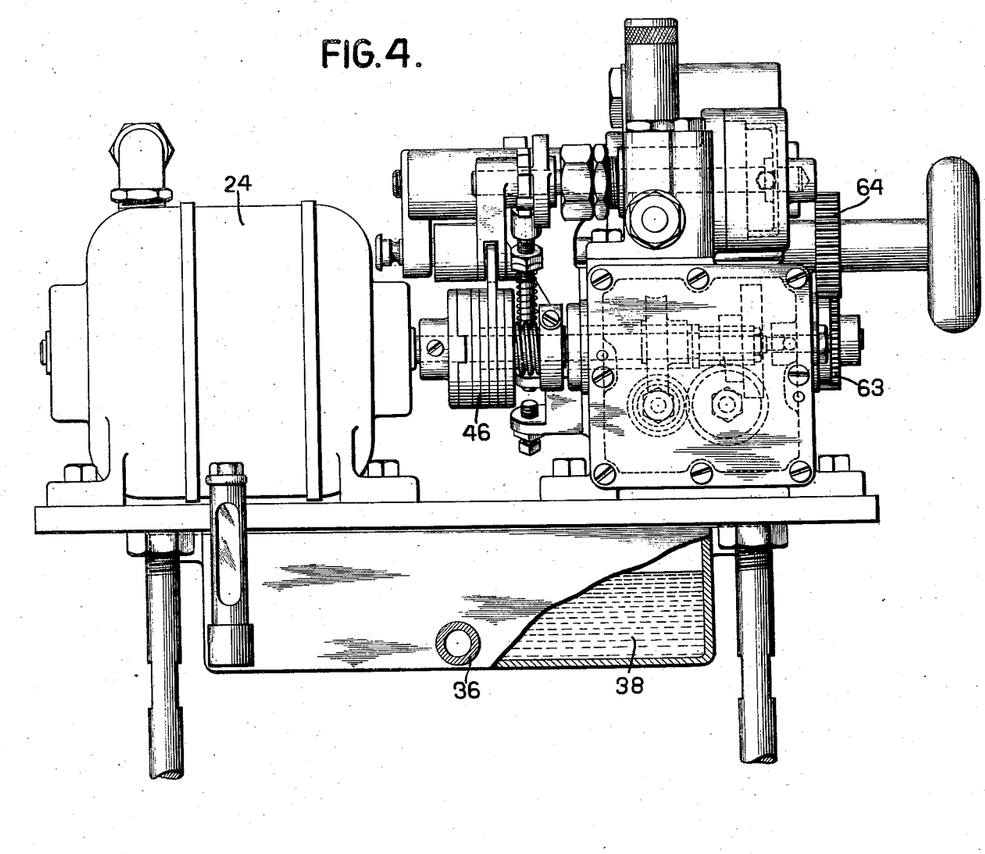
Figure 4 is a side elevation taken on the line 4—4 of Figure 3.

In Figure 1, 1 indicates the valve control mechanism for affecting the position of the valve in the valve casing 2. This valve controls the flow of fluid fuel from the supply source, which may be from a gas main or an oil tank, or any other suitable source, the direction of flow being indicated by the arrows. The supply line 3 leads the fuel to the burner shown diagrammatically at 4 located in an opening in the wall of the furnace 5. The flow of fuel to the burner 4 may be regulated in accordance with the outlet temperature of a heating coil 6 as reflected by any suitable means, such as the thermocouple 8 inserted in the coil outlet, or the control may be in response to the changes in temperature at any other suitable point in the furnace. The leads from this thermocouple are connected to a galvanometer or potentiometer system shown diagrammatically at 9 in a manner well known in the art. The galvanometer needle is indicated at 10 and is positioned so as to move in a horizontal plane. Switch members 11 and 12 are pivotally mounted within the range of movement of the galvanometer needle 10 but in a plane slightly above the plane in which the needle normally moves. The switch members are provided with adjustable stops 13 and 14 against which they are normally held by springs or other resilient means. Below the galvanometer needle 10 there is provided a chopper 15 operated continuously by any suitable mechanism illustrated diagrammatically at 16, periodically causing the chopper to be brought into contact with the needle 10 which in turn may strike one of the members 11 or 12 and deflect the same. This, of course, does not occur if the needle 10 is in a central position between the members 11 and 12 corresponding to the predetermined or selected temperature. The members 11 and 12 are connected respectively to conductors 17 and 18, which in turn are connected to solenoids 19, adapted to close the switches 20. These switches are normally retained in open position by springs. The solenoids 19 have a common terminal which is connected by conductor 21 to one of the terminals of a source of electrical energy illustrated diagrammatically by the generator 22. The other terminal of the generator 22 is connected by conductor 23 to chopper 15. The switches 20 control the energization of the motor 24 which receives its power through the conductors 26 from any suitable source (not shown).

By the periodical upward movement of the chopper 15 the galvanometer needle 10 may be brought into contact with one of the members 11 or 12 depending upon the direction in which it has been deflected by a change in temperature responsive to the thermocouple 8. The contacting of chopper 15, galvanometer needle 10 and one of the members 11 or 12, closes one of the circuits through conductors 17 or 18 to energize one of the solenoids 19, which will in turn close the switch controlled by it. It will be observed that the inner ends of members 11 and 12 are curved upwardly and they thus give a period of contact which varies with the extent of the deflection of the galvanometer needle from its normal position representing the normal temperature. Consequently the periods of time for which the motor 24 is energized will be dependent upon the extent of the departure of the temperature in the coil outlet from the desired temperature.

The valve mechanism 1 consists essentially of the balanced valve 30 within the valve casing 2 and is shown in a partially open position. The valve 30 is suspended on the valve stem 31 which is attached to and supported by the diaphragm 32 in the diaphragm casing 33. The diaphragm casing 33 is divided by the diaphragm into two chambers, $33^a$ and $33^b$. At the point 34 the valve stem 31 passes through a gland or stuffing box. The diaphragm chamber $33^b$ is connected by pipe 36, provided with a suitable valve 37, to an expansion reservoir 38.

The low pressure side of the valve casing 2 may be connected by a pipe 40 which leads to a point of lower pressure, preferably atmospheric pressure, at a point in the furnace, preferably near the burner 4, or the pipe 40 may be vented into the atmosphere. Intermediate the ends of the pipe 40 it may be divided into a parallel series of channels, each controlled by a separate valve, such as 41, 42 and 43 respectively. Two of these channels, for example those controlled by valves 41 and 42, may be provided with additional control means illustrated diagrammatically by the disc 44 connected by a series of levers or other suitable means 45 with a suitable clutch 46 on the shaft of the motor 24. The flow of fluid through the pipe 40 is also controlled by a valve 47, which is operated through means of the gears 48 and 49 and through gears in the box 50 connected to the shaft of the motor 24. The series of parallel paths and the control device designated by valves 41, 42, 43, the disc 44 and the levers 45 may be designated as the minor control means 52. A connecting pipe 53 is provided from a point between the control valve 47 and the minor control means 52 to the lower diaphragm chamber $33^a$.

Figure 5:
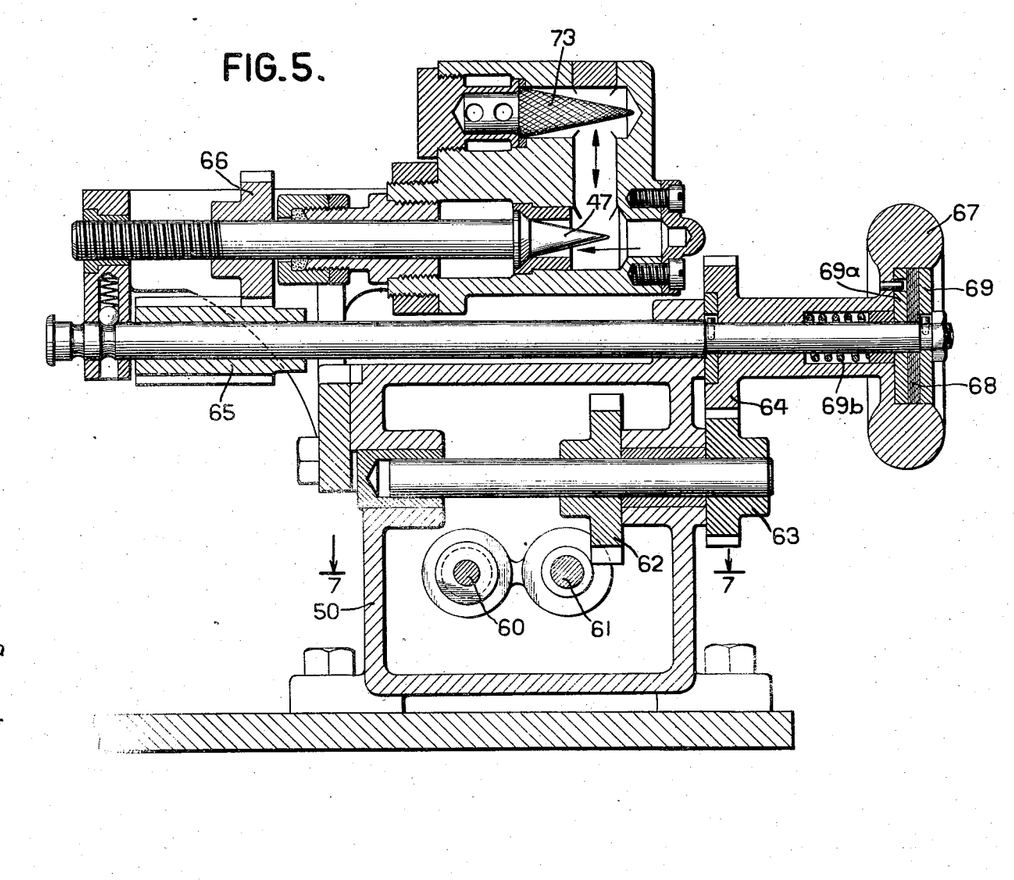
Figure 5 is a sectional view taken on the line 5—5 of Figure 3.

To illustrate more in detail a suitable mechanism for operating the valve 47, reference may be had to Figure 5. Motion may be transmitted to the valve 47 through shafts and a gear train consisting of 60, 61, 62, 63, 64, 65 and 66. Shafts 60 and 61 are in turn connected by a further train of gears to the shaft of the motor 24. Gear 64 may be disengaged from gear 63 and the valve 47 may be set at any desired position through means of the hand-wheel 67 by an outward horizontal movement of the hand-wheel 67 and gears 64 and 65, all of which are rigidly connected to a common shaft. In order to avoid ruining the seat of the valve 47, the shaft is connected to hand-wheel 67 and gear 64 through means of the clutch consisting of plate $69^a$ keyed to the wheel 67, discs 68 and plate 69 keyed to the shaft and held in frictional contact with each other by means of the small spring $69^b$.

An apparatus suitable for carrying out the operations of the minor regulating system 52 is illustrated in Figures 10, 11, 12 and 13. This may constitute a block in which a suitable series of parallel channels $a$, $b$ and $c$ are provided, controlled respectively by valves 41, 42 and 43. The channels $a$ and $b$ are also controlled by the position of the disc 44 which is provided with three ports 70, 71 and 72 (shown particularly in Figure 10). These ports are so positioned in the disc 40 as to come in substantial alignment with passages $a$ and $b$, enabling a full opening or a full closing of one or both of these passages. The disc 44 is mounted on a shaft 74 which co-operates with the system of levers 45 to control the position of the disc. These levers are provided with suitable stops so that the ports 70, 71 and 72 will come in substantial alignment with the channels $a$ and $b$ when a movement of the disc occurs in response to the regulating apparatus.

Figure 10:
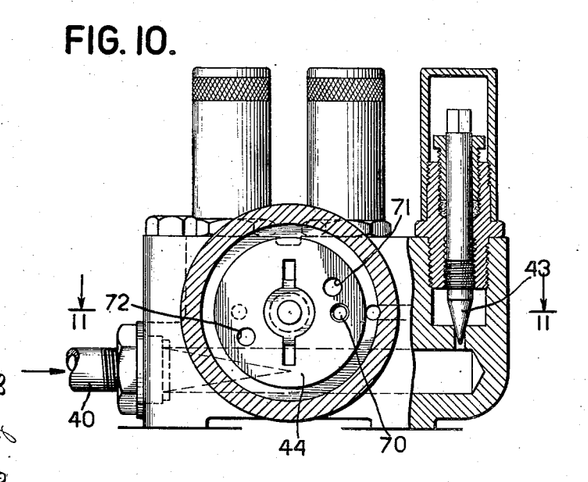
Figures 10, 11, 12 and 13 are partially sectional views of a portion of the control apparatus.
Figure 11:
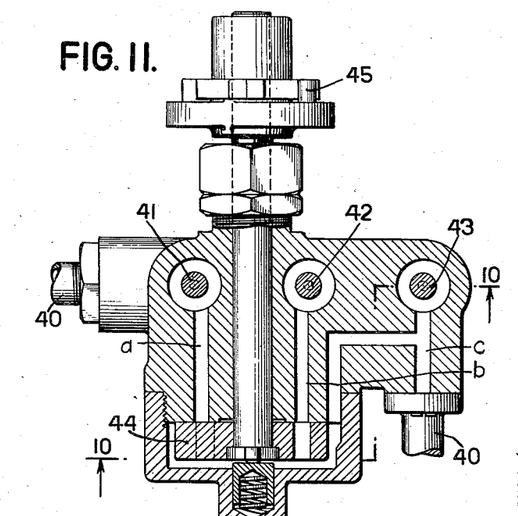

Figures 10 and 11 show the disc 44 in its normal position with one channel open.

Figure 12:
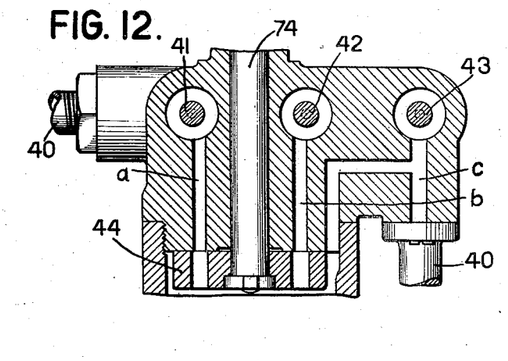
Figure 13:
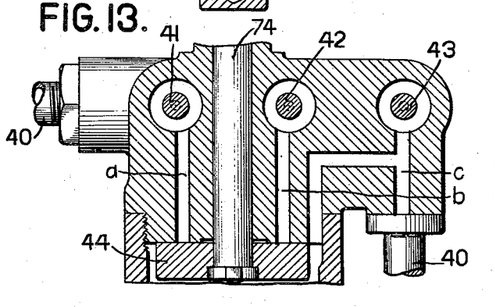

Figure 12 shows the ports 71 and 72 in alignment with channels $a$ and $b$, while Figure 13 shows both channels closed.

Figure 6:
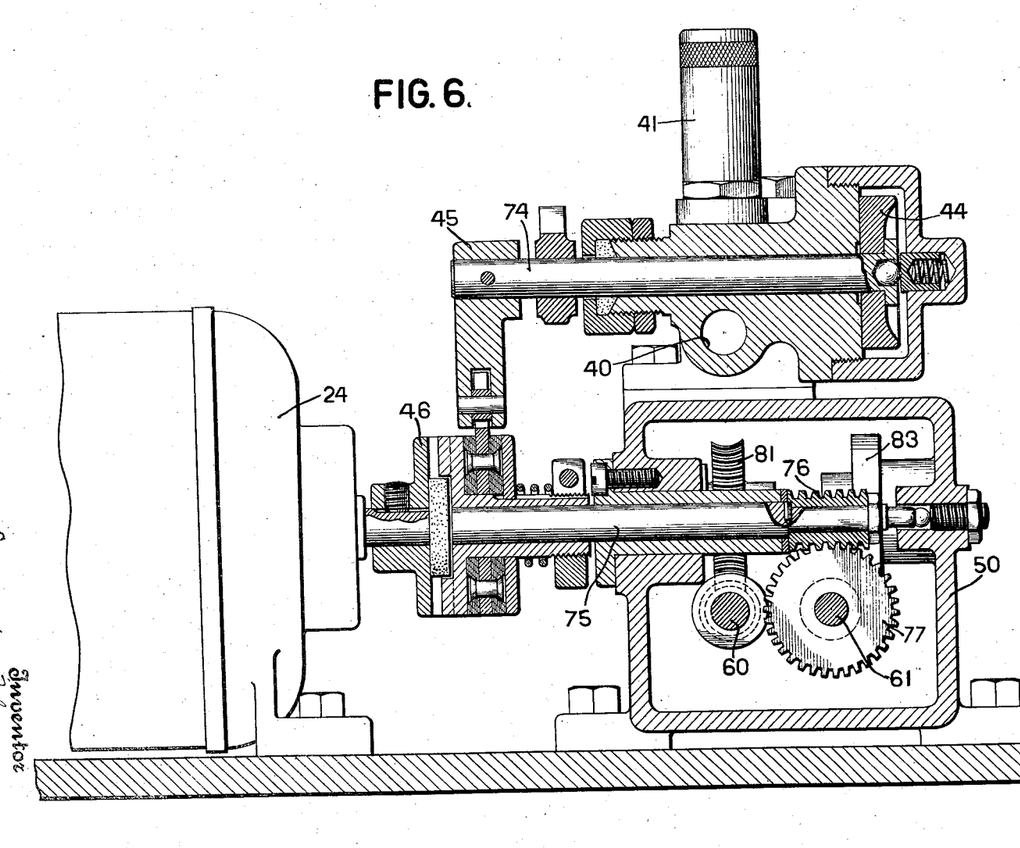
Figure 6 is a sectional view taken on the line 6—6 of Figure 3.
Figure 7:
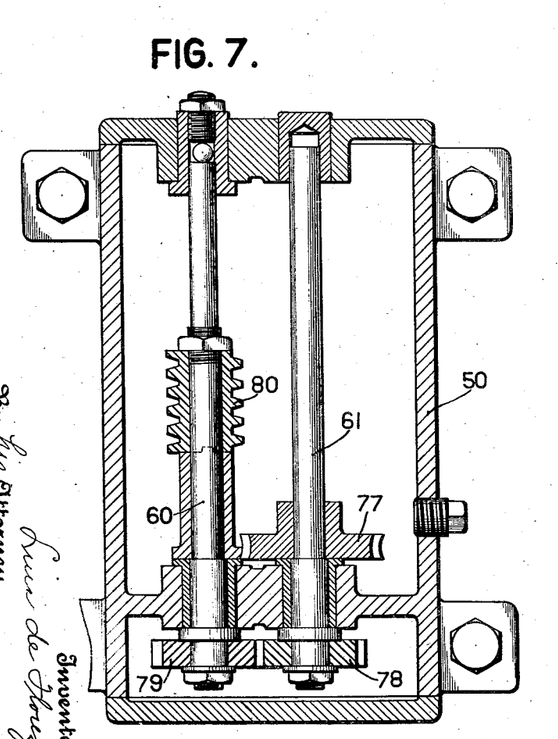
Figure 7 is a sectional view taken on the line 7—7 of Figure 5.
Figures 8, 9:
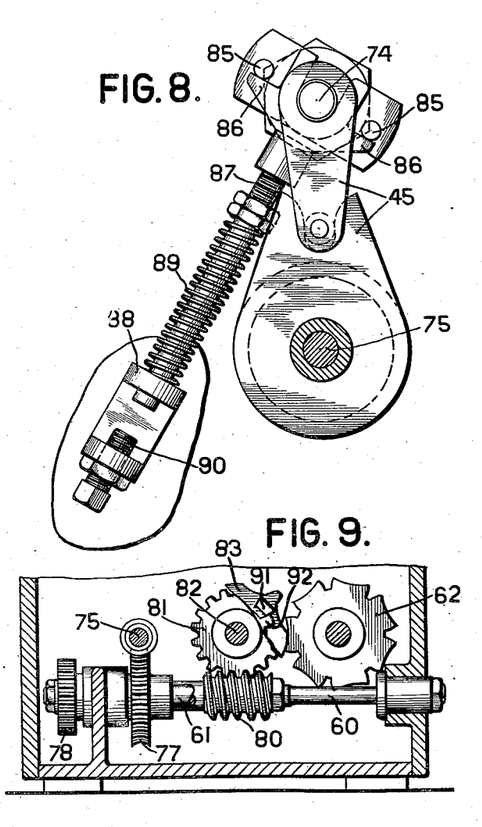
Figure 8 is a side elevation of a portion of the control apparatus.
Figure 9 is a sectional elevation partially broken away of the system of gears shown in Figures 6 and 7.

Referring particularly to Figures 6, 7 and 9, the arrangement of the gears connecting the shaft of the motor 24 with gears 63 and 64, illustrated in Figure 5, will be shown. The motor shaft 75 carries the worm gear 76, which co-operates with gear wheel 77 mounted on the shaft 61. The gear 78, also mounted on shaft 61, co-operates with gear 79 mounted on shaft 60, which additionally carries the worm gear 80. The worm gear 80 co-operates with gear wheel 81 mounted on shaft 82, upon which is also mounted parts of a Geneva stop mechanism consisting of Geneva stop pinion 83, pin 91, and finger 92, the latter being keyed to the shaft 82 while the pinion 83 is free to rotate. The single tooth of the Geneva stop pinion 83 is designed to co-operate with the Geneva stop wheel 62 to move the same a fraction of a turn, and it will be observed that a further movement of the wheel 62 will only take place after a complete revolution of the finger 92 in either direction.

The system of levers connecting the clutch 46 with the minor control system 52 is illustrated particularly in Figure 8, in which the levers 45 are shown connected on the one hand to the motor shaft 75 and on the other to the disc shaft 74. Stops 85 are rigidly mounted on shaft 74 and are adapted to co-operate with gears 86 which are rigidly attached to the arm 87, which is adapted to slide through an opening in the support 88. The support 88 also serves to hold the spring 89 which is coiled around the arm 87. The adjustable stop 90 is also provided against which the end of the arm 87 may be depressed.

The operation of the system may be described as follows:

The motor 24 periodically receives impulses in one direction or the other by the closing of one or the other of the switches 20 in response to the periodical contacting mechanism shown in Figure 1. The contacting mechanism preferably makes contacts which are proportional to the departure of the temperature from the predetermined or desired temperature. In other words, if the temperature is far from the desired temperature, the period of the contact will be relatively long, whereas if the temperature is only slightly off from the desired temperature, the period of each contact will be correspondingly short. When the motor 24 is thus energized, its movement is transmitted into a corresponding movement of the lever 45 and of the disc 44. The movement of the disc 44, however, is limited by the stop previously mentioned, so that the ports in the disc 44 may come in substantial alignment with the channels $a$ and $b$. After the period of energization of the motor 24 is completed, the disc is enabled to assume its normal position by means of the spring 89 on the arm 87.

Each time that the motor 24 has energized, corresponding motor will be imparted through the worm and gear trains 76, 77, 78, 79, 80 and 81 to the finger 92 to move it a short distance. No movement of the Geneva stop pinion 83 will take place, however, unless the finger 92 comes into contact with the pin 91. The next impulse of the motor 24 will move the finger 92 a further short distance so that it will require a considerable number of these partial impulses reflected from the contacted mechanism to rotate the finger 92 a complete revolution. Assuming that the finger 92 has co-operated with the pin 91 of the Geneva stop pinion 83 to move the Geneva stop wheel 62 a fraction of a turn, represented by the width of one of the teeth in the wheel, it will be observed from the foregoing description that the complete revolution in either direction of the finger 92 will be required to cause a further movement of the wheel 62.

As previously pointed out, both positive and negative corrections are made depending upon the direction in which the galvanometer needle moves from the central point in response to changes in the condition. Consequently, the finger 92 may be moved in either a clockwise or counter-clockwise direction without completing a revolution, and therefore, without causing a movement of the wheel 62. When the Geneva stop wheel 62 is moved a fraction of a turn this movement is transmitted through the gear train 63, 64, 65 and 66 and the shafts upon which these gears are mounted to effect a movement or resetting of the valve 47. This movement may either partially open or partially close valve 47 and result in what may be termed the major correction in the setting of valve 30. These corrections effect a continuing change in the valve setting inasmuch as they are maintained until the motor 24 shall again have effected a major correction.

A small amount of water or other liquid is placed in receptacle 38 and allowed to fill the pipe 36 and the upper diaphragm chamber $33^b$. The fluid to be regulated flows through the valve 30 and supply line 3. A small amount of this fluid also flows through pipe 40, normally past valves 42 and 43 and through the valve 47 to the exit end of the pipe 40. The position of the diaphragm 32 and consequently of the valve 30 will depend upon the balancing of forces between the water in the upper diaphragm chamber $33^b$ and the fluid in the lower diaphragm chamber $33^a$. Assuming that the temperature in the furnace 5 or in the coil 6 is too low, the motor 24 will be energized and through the clutch 46 and levers 45 the disc 44 will be moved in a counter-clockwise direction, momentarily closing off both channels $a$ and $b$. This will effect a momentary drop in pressure at the valve 47, which will cause an outward flow of fluid through the pipe 53 from the lower diaphragm chamber $33^a$ reducing the pressure therein. Inasmuch as the pressure on the upper surface of the diaphragm 32 is constant, the diaphragm will move in a downward direction and accordingly open the valve 30 and permit more fluid to flow through the valve and through the pipe 3. This unbalancing of the pressures in the system will only be for the duration of the period of contact and consequently for the period during which the motor 24 is energized and the ports of the disc 44 are closed. If the temperature of the furnace 5 continues to be too low, a series of these impulses will be made to the motor 24 until the temperature has been returned to normal or until they have resulted in a movement of the gears 48 and 49 through the Geneva stop mechanism in the box 50 to effect a re-setting of the valve 47. The reverse action will take place if the temperature of the furnace is too high.

In any event whether changes are made by the minor regulating means 52 or by the major regulating valve 47, the changes in pressure resulting therefrom will be reflected to the lower diaphragm chamber 33ª which will correspondingly cause a change in the setting of the fuel valve 30. This change in the setting of valve 30 may be damped or delayed to any desired degree by regulating the setting of the valve 37 in the line 36 through which the water or other liquid maintained above the diaphragm 32 may flow, upon a change in the position of the diaphragm 32.

Furthermore, the fuel supply is independent of the pressure of the fuel supply source since an increase in this pressure will result in a momentary increase in pressure on the delivery side of the valve 30 and in the pressure in the lower diaphragm chamber 33ª, causing an adjustment in the position of the valve 30 to compensate for the pressure change; similarly a decrease in pressure of the supply source will cause a change in the setting of the valve 30 to further open it and permit the flow of fuel to continue at a normal or desired rate.

Whatever may be the type of control mechanism employed or the character of corrections applied, the invention embodies a fundamentally new manner of controlling the flow characterized by venting to a point of lower pressure a small portion of a fluid on the low pressure side of a balanced diaphragm valve and reflecting to one side of the diaphragm changes in pressure resulting from the operation of the regulating means, thereby effecting the setting of the diaphragm valve to maintain automatically the normal or desired rate of flow. In the illustration of the invention, of a fluid fuel-heated furnace, the venting of the small portion of fuel for regulatory purposes may be at a point in the furnace where this fuel will burn, and it is to be observed that the amount of fuel thus vented has no appreciable effect on the furnace temperature.

What I claim is:

1. In a fluid supply system the combination comprising a supply line, a diaphragm valve located therein and having a diaphragm, means for subjecting one side of the diaphragm to a predetermined pressure, a chamber of which one wall is the other side of the diaphragm, means for continuously withdrawing a small portion of fluid from the low pressure side of said valve, means for automatically regulating the amount of such withdrawal, and a fluid pressure compensating line between the point of regulation and the chamber, whereby movement of the diaphragm valve is effected in accordance with the regulating means to thereby control the flow of fluid in the supply line.

2. In a fluid supply system the combination comprising a supply line, a diaphragm valve located therein and having a diaphragm, means for subjecting one side of the diaphragm to a predetermined pressure, a chamber of which one wall is the other side of the diaphragm, a conduit for continuously withdrawing a small portion of fluid from the low pressure side of said valve, regulating means located in said conduit for establishing a normal flow of fluid therethrough, additional regulating means for enabling an increased or a decreased flow, and a fluid pressure compensating line between the point of regulation and the chamber, whereby movement of the diaphragm valve is effected in accordance with the regulating means to thereby control the flow of fluid in the supply line.

3. In a fluid supply system the combination comprising a supply line, a diaphragm valve located therein and having a diaphragm, means for subjecting one side of the diaphragm to a predetermined pressure, a chamber of which one wall is the other side of the diaphragm, a conduit for continuously withdrawing a small portion of fluid from the low pressure side of said valve and for venting said fluid to a point of lower pressure, a major regulating valve in said conduit for controlling the normal rate of fluid vent, a minor regulating system situated at a point preceding the major regulating valve and adapted to effect momentary changes in the rate of fluid venting above and below the normal rate, and a fluid pressure compensating line from a point in the conduit between the major regulating valve and the minor regulating system to the chamber, whereby movement of the diaphragm valve is effected in accordance with both the major regulating valve and the minor regulating system to thereby control the flow of fluid in the supply line.

4. In a fluid supply system the combination comprising a supply line, a diaphragm valve located therein and having a diaphragm, means for subjecting one side of the diaphragm to a predetermined pressure, a chamber of which one wall is the other side of the diaphragm, a conduit for continuously withdrawing a small portion of fluid from the low pressure side of said valve and for venting said fluid to a point of lower pressure, a major regulating valve in said conduit for controlling the normal rate of fluid vent, a minor regulating system situated at a point preceding the major regulating valve and adapted to effect momentary changes in the rate of fluid venting above and below the normal rate, a central control device for actuating the major control valve and the minor regulating system, and a fluid pressure compensating line from a point in the conduit between the major regulating valve and the minor regulating system to the chamber, whereby movement of the diaphragm valve is effected in accordance with both the major regulating valve and the minor regulating system to thereby control the flow of fluid in the supply line.

5. In a fluid fuel supply system leading to a furnace or the like, a combination comprising a supply line, a diaphragm valve located therein and having a diaphragm, means for subjecting one side of the diaphragm to a predetermined pressure, a chamber of which one wall is the other side of the diaphragm, a conduit for continuously withdrawing a small portion of the fluid fuel from the low pressure side of said valve and for venting the fuel thus withdrawn to the furnace, means for automatically regulating the amount of such withdrawal in accordance with variations in temperature at a selected point in the furnace, and a fluid pressure compensating line between the point of regulation and the chamber, whereby movement of the diaphragm valve is effected in accordance with the regulating means to thereby control the flow of fluid fuel in the supply line and maintain the temperature of the furnace substantially constant.

In witness whereof I have hereunto set my hand and seal this 27th day of December, 1928.

LUIS DE FLOREZ.